(12) United States Patent
Martin

(10) Patent No.: US 9,234,390 B2
(45) Date of Patent: Jan. 12, 2016

(54) BEARING ASSEMBLY FOR ROTARY DRILLS

(75) Inventor: Kevin Martin, Doylestown, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 1005 days.

(21) Appl. No.: 13/805,093

(22) PCT Filed: Jun. 30, 2010

(86) PCT No.: PCT/US2010/040634
§ 371 (c)(1),
(2), (4) Date: Dec. 18, 2012

(87) PCT Pub. No.: WO2012/002961
PCT Pub. Date: Jan. 5, 2012

(65) Prior Publication Data
US 2013/0092448 A1   Apr. 18, 2013

Related U.S. Application Data

(60) Provisional application No. 61/269,889, filed on Jun. 30, 2009.

(51) Int. Cl.
| | |
|---|---|
| *E21B 10/00* | (2006.01) |
| *E21B 10/22* | (2006.01) |
| *F16C 33/00* | (2006.01) |
| *E21B 4/00* | (2006.01) |
| *F16C 19/38* | (2006.01) |
| *F16C 35/067* | (2006.01) |

(52) U.S. Cl.
CPC ............... *E21B 10/22* (2013.01); *E21B 4/003* (2013.01); *F16C 19/386* (2013.01); *F16C 33/00* (2013.01); *F16C 35/067* (2013.01); *F16C 2226/70* (2013.01)

(58) Field of Classification Search
CPC ..... E21B 4/003; E21B 10/22; F16C 2240/30; F16C 2240/34; F16C 19/10; F16C 19/14; F16C 19/163
See application file for complete search history.

(56) References Cited

U.S. PATENT DOCUMENTS

| | | | | |
|---|---|---|---|---|
| 1,966,574 A | * | 7/1934 | Wenneborg | 623/32 |
| 2,915,291 A | * | 12/1959 | Lars Gulfelt | 175/348 |
| 3,429,390 A | * | 2/1969 | Bennett | 175/343 |
| 3,639,016 A | * | 2/1972 | Bourgeois | 384/482 |
| 3,998,500 A | * | 12/1976 | Dixon | 384/96 |
| 4,084,649 A | * | 4/1978 | van Nederveen | 175/366 |

* cited by examiner

*Primary Examiner* — Cathleen Hutchins
(74) *Attorney, Agent, or Firm* — Mark Ussai; SKF USA Inc. Patent Dept.

(57) ABSTRACT

A bearing assembly is for a rotary drill, the drill including a base with a shaft and a bit. The bearing assembly includes a bearing having a central axis and including an inner member disposeable on the shaft and an outer member disposed about the inner member. The outer member is angularly displaceable about the axis with respect to the inner member and having an outer circumferential surface and a recess extending generally radially inwardly from the outer surface. At least one and preferably a plurality of retainer members are each disposed at least partially within the bearing outer member recess and is configured to engage with the bit so as to rotatably couple the bit with the shaft. Preferably, each retainer member includes a generally spherical ball rollable through a passage and into the bearing recess during installation into the recess.

26 Claims, 9 Drawing Sheets

BEARING ASSEMBLY FOR ROTARY DRILLS

CROSS-REFERENCE

This application is the U.S. national stage of International Application No. PCT/US2010/040634 filed on Jun. 30, 2010, which claims the benefit of U.S. Provisional Patent Application No. 61/269,889, filed on Jun. 30, 2009.

The present invention relates to bearings, and more particularly to bearings for rotary drills.

Rotary drills are known and typically include a bit head with a plurality of rotatable bits each mounted on a separate shaft. The bit head is connected with a drill string that includes one or more sections of drill pipe. The drill pipe is rotated about a centerline such that the bits roll against a ground surface, causing each bit to rotate upon its associated shaft. Typically, each bit is rotatably secured to the shaft by a plurality of retaining balls located in a circumferential channel defined between the bit and the shaft. The balls are installed within the channel through a passage that extends through the shaft.

SUMMARY OF THE INVENTION

In one aspect, the present invention is a bearing assembly for a rotary drill, the drill including a base with a shaft and a bit. The bearing assembly comprises a bearing having a central axis and including an inner member disposeable on the shaft and an outer member disposed about the inner member. The outer member is angularly displaceable about the axis with respect to the inner member and having an outer circumferential surface and a recess extending generally radially inwardly from the outer surface. At least one retainer member is disposed at least partially within the bearing outer member recess and is configured to engage with the bit so as to rotatably couple the bit with the shaft.

In another aspect, the present invention is a rotary drill comprising a base with a shaft and a bearing having a central axis and including an inner member disposed on the at least one shaft and an outer member disposed about the inner member. The bearing outer member is angularly displaceable relative to the inner member and has an outer circumferential surface and a recess extending generally radially inwardly from the outer surface. A bit has an inner circumferential surface defining a cavity, the bit being disposed about at least a portion of the shaft such that the bearing is disposed at least partially within the cavity. Further, at least one retainer is disposed at least partially within the bearing outer member recess and is configured to engage with the bit so as to rotatably couple the bit with the shaft.

In a further aspect, the present invention is also a mechanical assembly comprising an inner component and a bearing including an inner member disposed about at least a portion of the inner component and an outer member disposed about the inner member. The bearing outer member has an outer surface and a recess extending radially inwardly from the outer surface. An outer component has an inner surface defining a cavity, an outer surface, and a passage extending between the inner and outer surfaces, the cavity being configured to receive at least a portion of the bearing. At least one retainer is insertable through the outer component passage, is at least partially disposeable within the bearing recess, and is configured to engage with the outer component so as to rotatably couple the outer component with the inner component.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
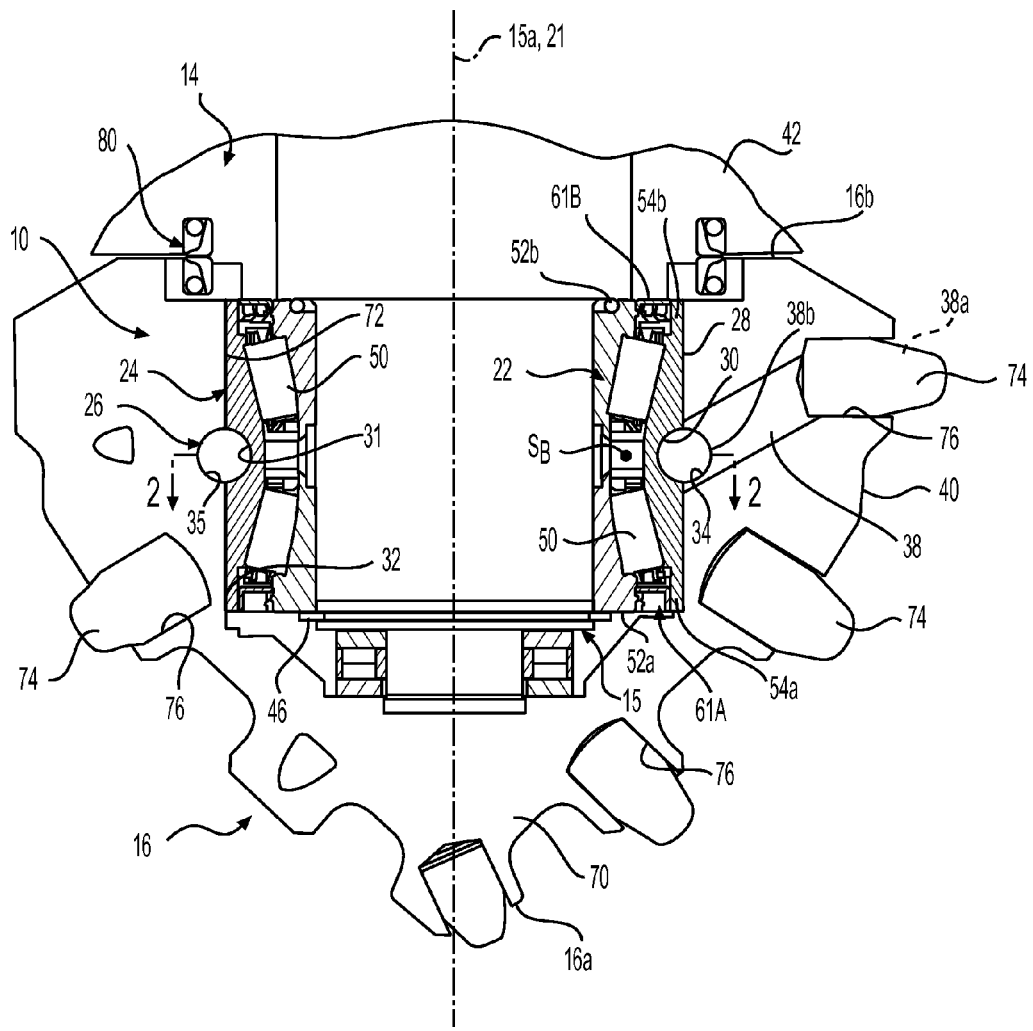
FIG. 1 is a partly broken-away, axial cross-sectional view of a bearing assembly of the present invention, shown installed in a bit of a rotary drill.

Certain terminology is used in the following description for convenience only and is not limiting. The words "inner", "inwardly" and "outer", "outwardly" refer to directions toward and away from, respectively, a designated axis, a centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a bearing assembly 10 for a rotary drill 12, the drill 12 including a bit head or base 14 with one or more shafts 15, at least one and preferably a plurality of bits 16, and at least one drill pipe (none shown), as described in further detail below. The bearing assembly 10 basically comprises a bearing 20, the bearing 20 having a central axis 21 and including an inner member 22 disposeable on one shaft 15 and an outer member 24 disposed about the inner member 22, and at least one and preferably a plurality of retainers 26. The bearing outer member 24 is angularly displaceable about the central axis 21 with respect to the inner member 22 and has an outer circumferential surface 28 and a recess 30 extending generally radially inwardly from the outer surface 28. The at least one retainer 26 is disposed at least partially within the bearing outer member recess 30 and is configured to engage with an associated or proximal one of the bits 16 so as to rotatably couple the bit 16 with the shaft 15. Further, each bearing assembly 10 and/or its associated bit 16 are configured such that the bit 16 and the bearing outer member 24 are rotationally "interlocked" to prevent relative angular displacement between the bearing member 24 and the bit 16, as described in further detail below.

Figure 2:
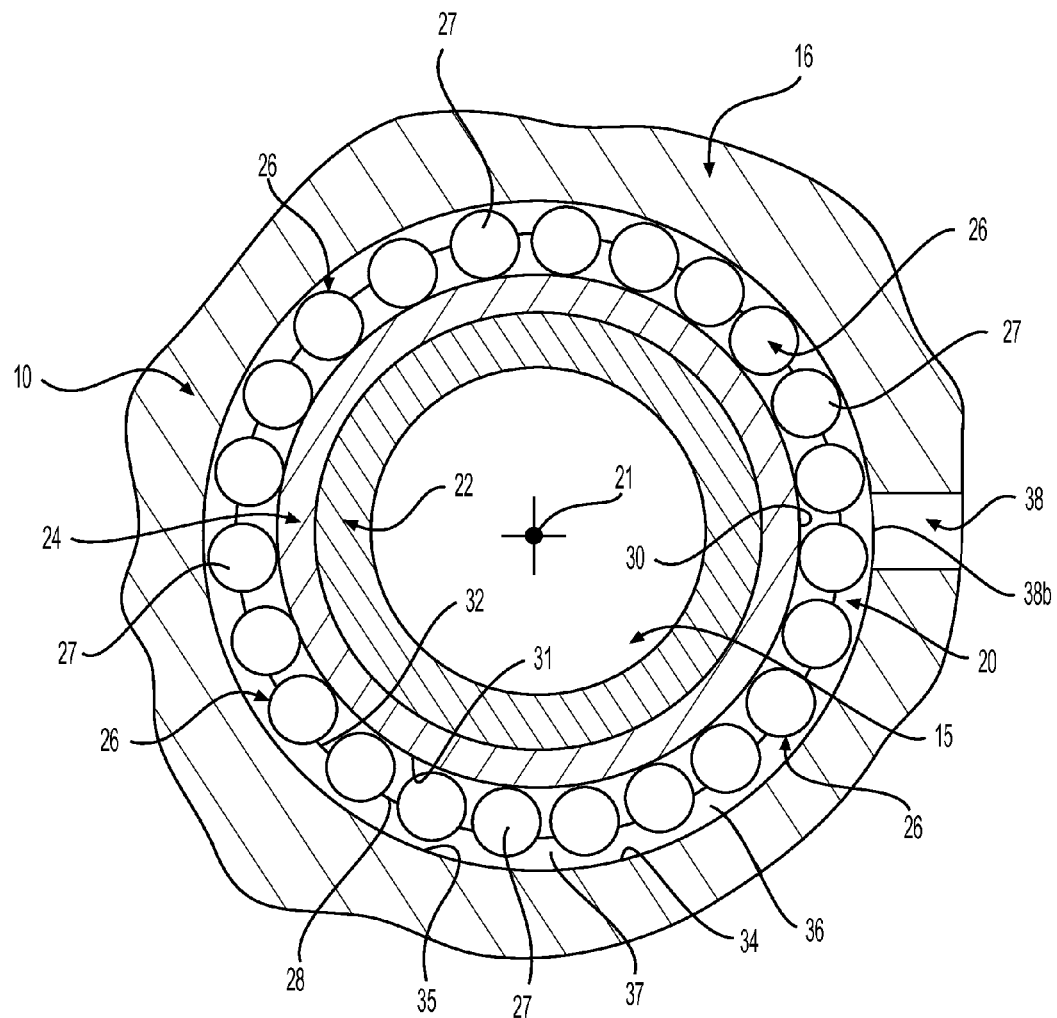
FIG. 2 is a broken-away, radial cross-sectional view taken through line 2-2 of FIG. 1.

Preferably, each bit 16 has an inner circumferential surface 32 and at least one recess 34 extending generally radially outwardly from the surface 32, the bit recess 34 being generally alignable with the bearing recess 30 so as to form a retention cavity 36. Preferably, each recess 30, 34 is formed as an at least partially annular groove 31, 35, respectively, such that the retention cavity 35 defined by the aligned grooves 31, 35 is formed as an at least partially annular retention channel 37. As best shown in FIG. 2, each groove 31, 35 most preferably extends circumferentially about the bearing central axis 21 and is continuous, with the two grooves 31, 35 being generally alignable both radially and axially with respect to the central axis 21 so as to form a single, continuous retention channel 37 that is at least generally annular.

With the preferred retention channel structure, the one or more retainers 26 are each simultaneously disposeable at least partially within each of the aligned bit and bearing grooves 35, 31, respectively. Thus, the one or more retainers 26 function to releasably lock the bit 16 onto the bearing 20, and thereby also onto the associated shaft 15, by interference between the retainers 26 and the portions of the bit 15 and the bearing 20 which surround/define the grooves 31, 35. Most preferably, the at least one retainer 26 includes a plurality of retainers 26 spaced apart circumferentially about the central axis 21, each retainer 26 being disposed at least partially within the bearing groove 31 and configured to engage with the bit 16, as shown in FIG. 2. Further, as there may be clearance space between the outer surface 28 of the bearing outer member 24 and the bit inner surface 32, the one or more retainers 26 are also each preferably configured to transfer radial and/or axial loading between the bit 16 and the bearing 20, and thus also between the bit 16 and the shaft 15.

Although a single, continuous annular retention channel 37 formed by a pair of aligned grooves 31, 35 is preferred, the bearing 20 and/or the bit 16 may alternatively each include a plurality of separate, circumferentially-spaced recesses 30, 34, respectively, that align in pairs to form a plurality of separate retention cavities 35, each cavity 35 being generally spherical, generally arcuate, or having any other appropriate shape. Also, although the bit 16 preferably has a recess 34/groove 35, such that the retainers 26 positively interlock with the associated bit 16, the one or more retainers 26 may alternatively directly frictionally engage with a bearing inner surface 32 to thereby retain the bit 16 coupled with the associated shaft 15.

Figure 9:
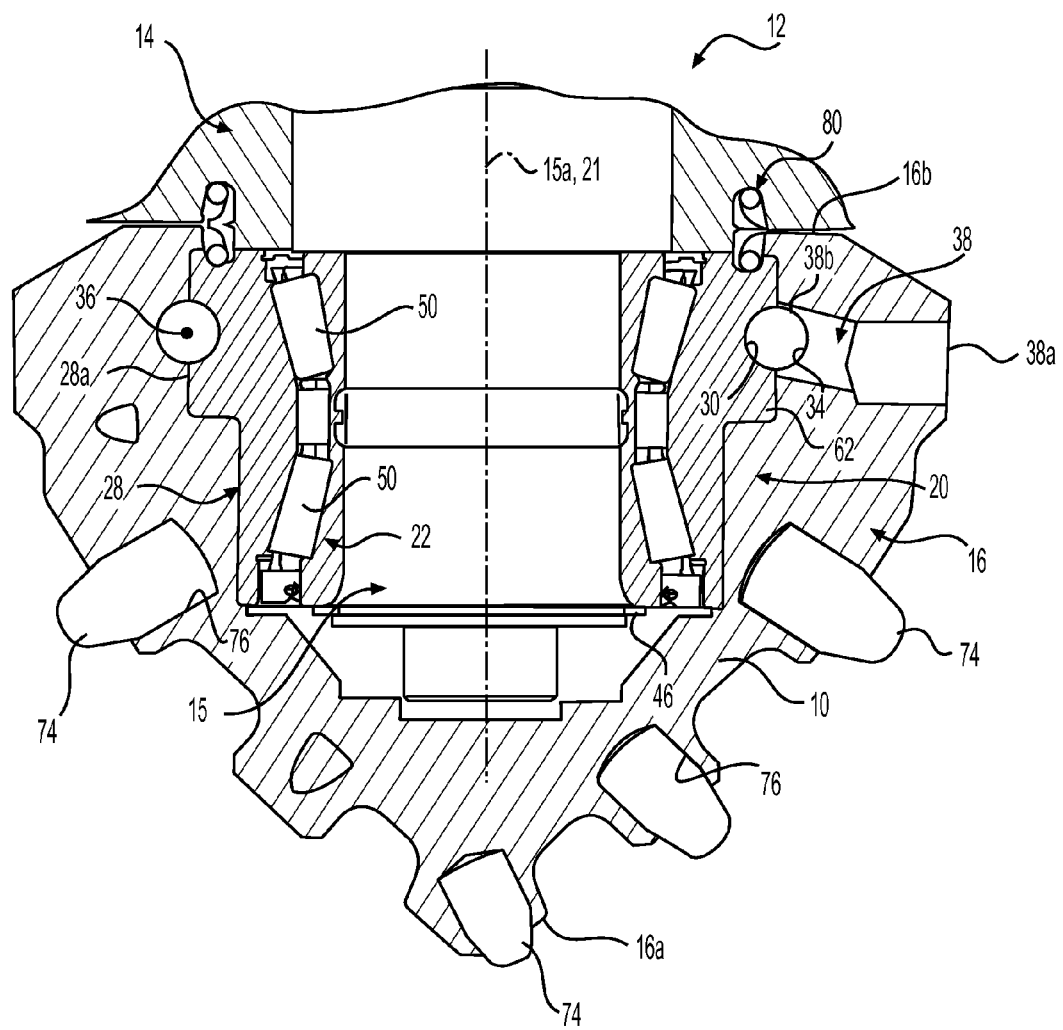
FIG. 9 is a partly broken-away, axial cross-sectional view of an alternative construction of the bearing assembly.

Further, each of the one or more bits 16 preferably includes at least one access passage 38 for installation and removal of the retainers 26 into the retention cavity 36. Specifically, each bit 16 further has an outer surface 40 and the passage 38 extends generally radially between the bit outer and inner surfaces 40, 32, respectively. The passage 38 is preferably angled in an inward direction toward the bit front end 16a, as shown in FIGS. 1, 4, 6 and 7 and described in further detail below, but may alternatively be angled in an inward direction toward the bit rear end 16b, as shown in FIG. 9. Furthermore, the passage 38 is communicable with at least the bearing recess 30, and preferably the two grooves 31, 35 forming the preferred continuous retention channel 37, such that each of the one or more retainers 26 is installable into the recess 30/channel 37 through the bit passage 38. Furthermore, the bit 16 may only include a single access passage 38 when the bearing assembly 10 includes a single, continuous retention channel 37, but the bit 16 should include a plurality of passages 38 when the bearing assembly 10 includes a plurality of separate retention cavities 36 (i.e., at least one passage 38 for each cavity 36).

Preferably, each of the bearing and bit grooves 31, 35 has partially circular cross-sections in directions perpendicular to the bearing axis 21, such that the retention channel 37 is generally annular and has at least generally circular radial cross-sections with respect to the bearing axis 21 (i.e., radial directions), and the bit access passage 38 also has generally circular cross-sections. With the preferred passage and groove structures, each of the one or more retainers 26 is preferably formed as, or includes, a generally spherical ball 27 configured to roll through the passage 38 and into the bearing and bit grooves 31, 35 during installation into the retention channel 37. More specifically, each bit passage 38 has an outer end 38a at the bit outer surface 38 and an inner end 38b at the bit recess 34/groove 35 or, if the bit 16 is formed without a cavity/groove, at the bit inner surface 32. Further, the bit access passage 38 and each retainer 26 is configured (i.e., angled circular passage and spherical balls) such that the plurality of retainers 26 are installable into the two aligned grooves 31, 35 of the preferred retention channel 37 in the following manner.

Each retainer 26 is sequentially inserted through the bit passage outer end 38a and rolls through the passage 26, preferably assisted by gravity due to the angled passage 26 and orientation of the bit 16. The retainer 26 then passes through the passage inner end 38b and becomes disposed within the retention channel 37. As each subsequent retainer 26 enters the channel 37, the particular retainer 26 contacts at least one of the previously installed retainers 26, such that kinetic energy transferred to the retainers 26 located in the channel 37 displaces the retainers 26 already disposed within the channel 37 so that the plurality of retainers 26 become spaced circumferentially about the bearing central axis 21, as shown in FIG. 2.

Figure 10:
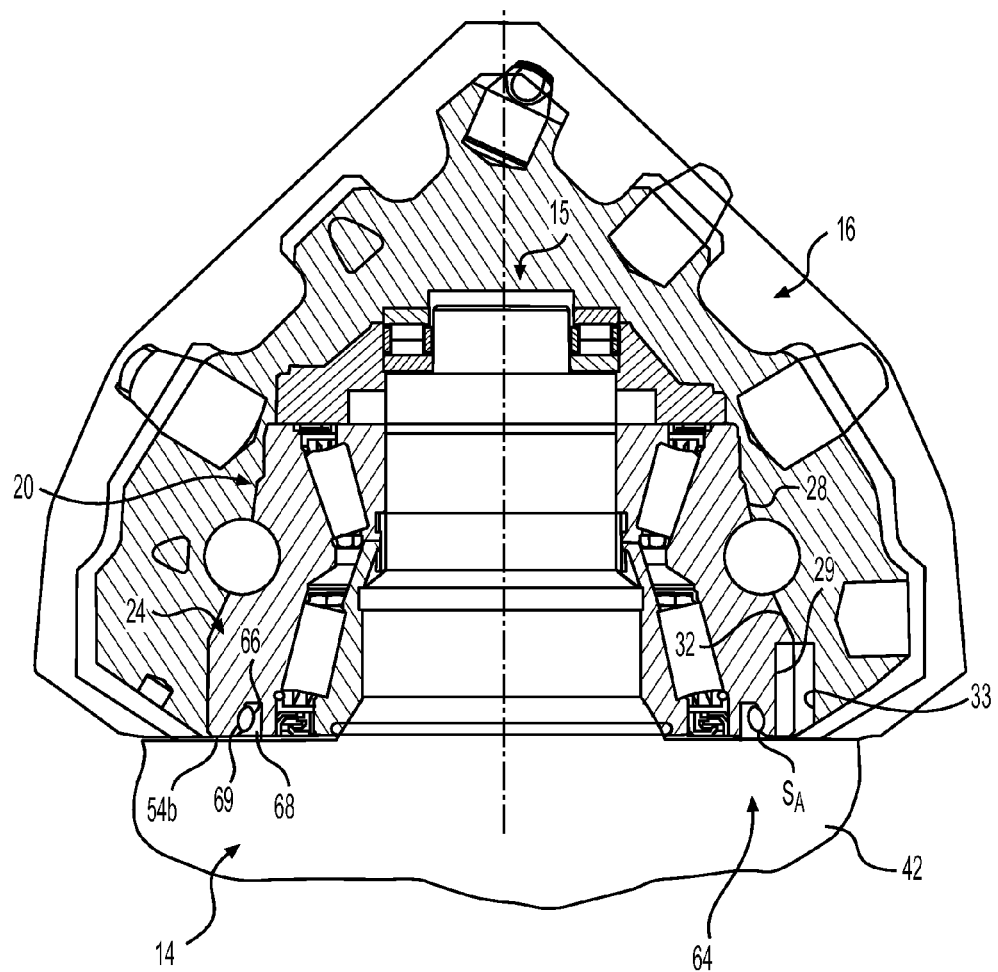
FIG. 10 is a partly broken-away, axial cross-sectional view of another alternative construction of the bearing assembly.
Figure 11:
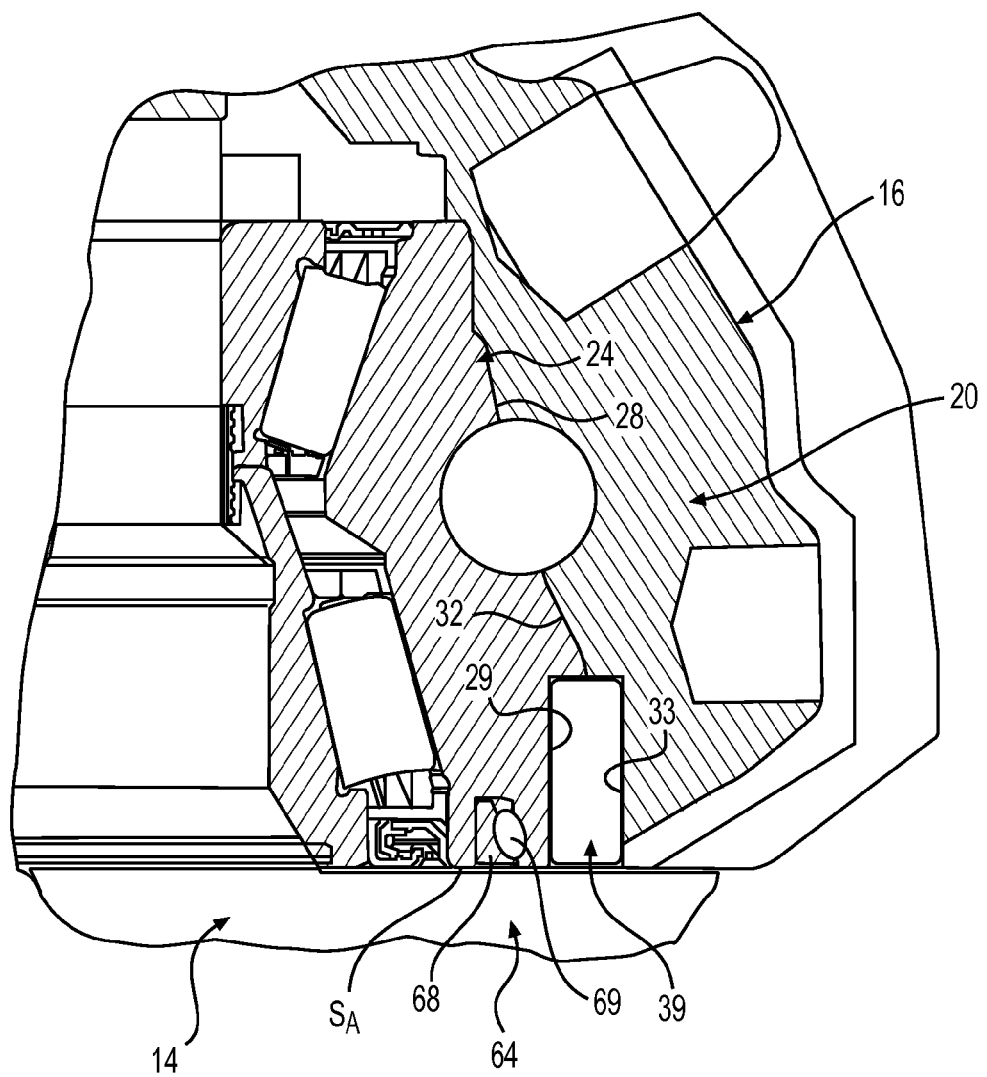
FIG. 11 is an enlarged, broken-away view of a section of FIG. 10.

Referring to FIGS. 10 and 11, as discussed above, each bearing assembly 10 and/or associated bit 16 are configured to positively rotationally interlock so as to prevent relative angular displacement between the bearing outer member 24 and the bit 16. Preferably, the bit outer member 24 includes at least one generally axial groove 29 extending radially inwardly from the member outer surface 28 and the bit 16 has at least one generally axial groove 33 extending radially outwardly from the bit inner surface 32 and generally alignable with one of the bearing member axial grooves 29. With this structure, a locking member 39 (FIG. 11), for example, a shaft or pin, is disposeable within each set of aligned grooves 29, 33 to interlock the bit 16 and the bearing 20. Preferably, the locking member 39 is first positioned within the bearing groove 29 and then the bit 16 is assembled onto/about the bearing 20 such that the locking member 39 becomes inserted into the associated bit groove 33. Further, each bearing 20 and associated bit 16 preferably includes a plurality of grooves 29, 33 (only one pair shown), respectively, spaced circumferentially about the bearing axis 21 and a separate locking member 39 (only one shown) is inserted within each pair of aligned grooves 29/33, and most preferably the bearing assembly 10 includes four locking members 39 and four groove pairs 29/33.

However, although separate locking members 39 are presently preferred, each bearing assembly 10 and associated bit 16 may be rotationally "interlockable" in any other appropriate manner, such as for example, by providing one or more splines or tongues in one member 24, 16 and corresponding grooves or recesses in the other member 16, 24, by forming each of the bit 16 and the bearing outer member 24 with mating interior and exterior perimeter surfaces (e.g., rectangular, hexagonal, octagonal, complex-shaped, etc.), or by another appropriate structure. Further, although it is preferred to positively interlock the bit 16 onto the bearing 20, the two components 16, 24 may be rotationally coupled or interlocked merely by a friction fit between the bearing outer surface 28 and the bit inner surface 32.

With the above-described structure, each bit 16 is readily installable onto a shaft 15 merely by positioning the bit 16 onto the bearing 20, as discussed above and described in further detail below, and then inserting one or more retainers 26 through each bit access passage 38 until a desired number of retainers 26 become located within the retention channel 37. Alternatively, when it is desired to remove the bit 16 from the associated shaft 15, the retainers 26 are extracted from the retention channel 37, for example, by means of a magnet or by physically pushing or pulling the retainers 26 from the channel 37, so that the bit 16 may be pulled off the bearing 20, and thus the shaft 15, for maintenance, repair or replacement. Having described the basic components of the bearing assembly 10 and the rotary drill 12 above, these and other elements of the present invention are be described in further detail below.

Figure 3:
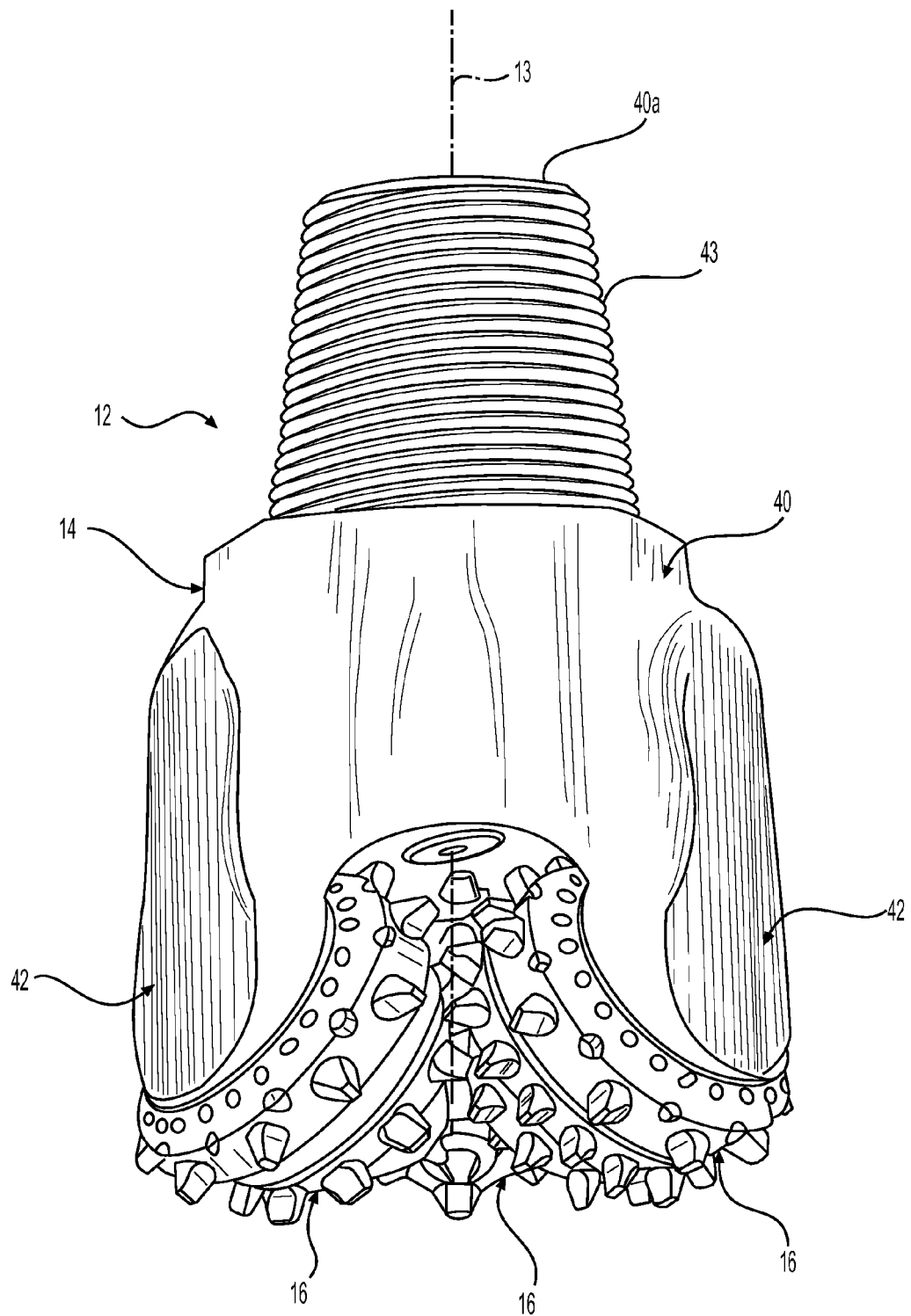
FIG. 3 is a perspective view of a rotary bit head incorporating the bearing assembly.
Figure 4:
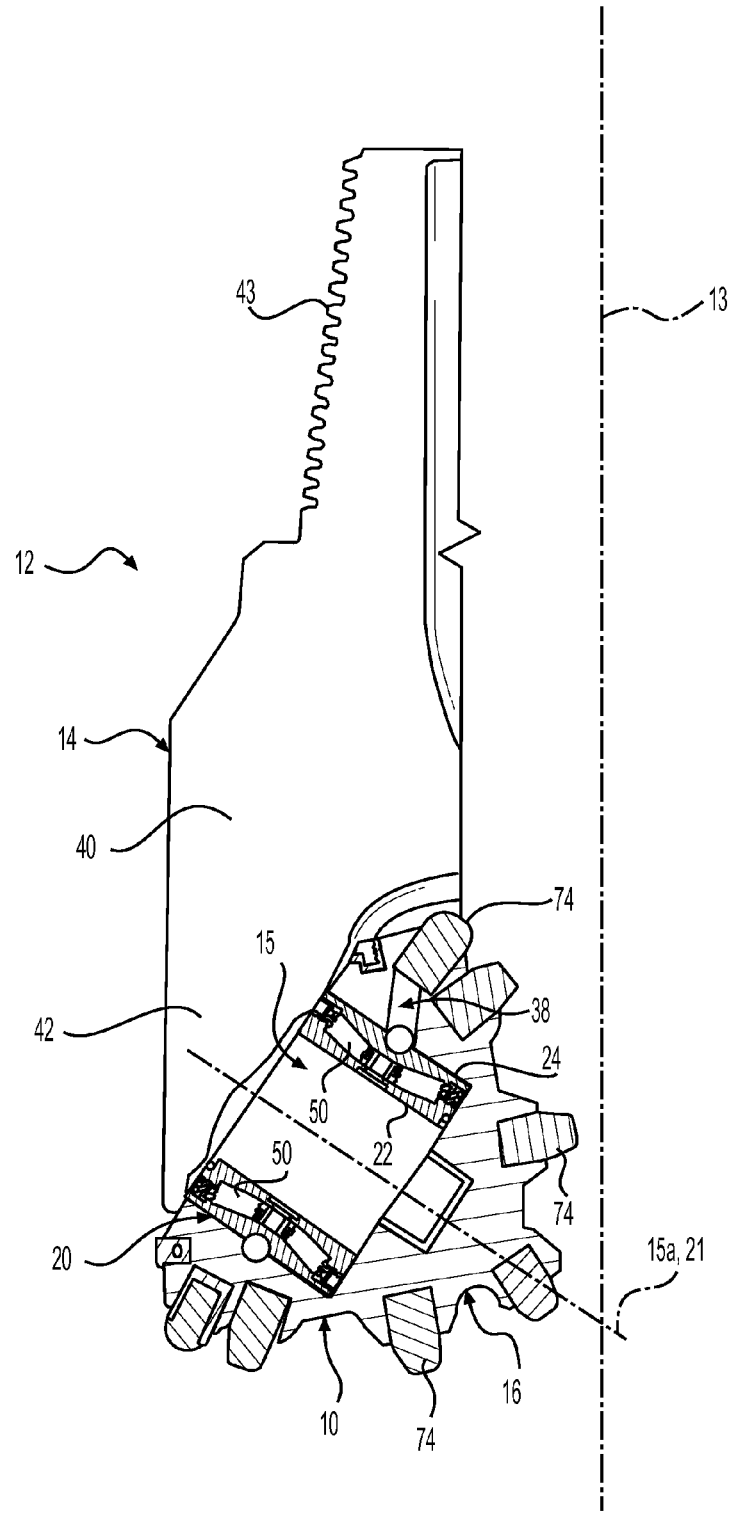
FIG. 4 is a partly broken-away, axial cross-sectional view of the bit head, showing one head or base portion with a shaft and the bearing assembly.
Figure 5:
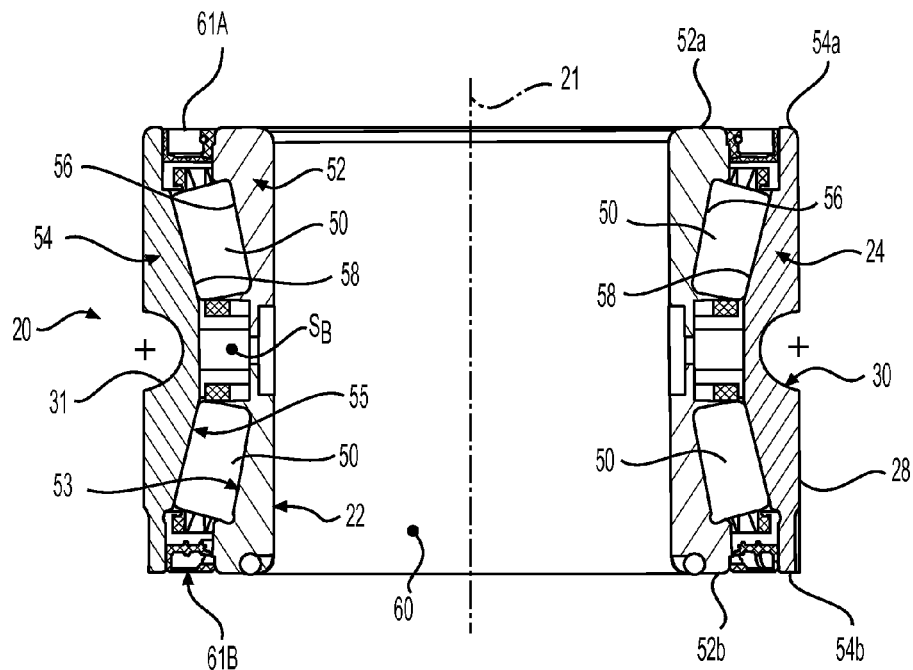
FIG. 5 is an axial cross-sectional view of bearing of the bearing assembly.
Figure 6:
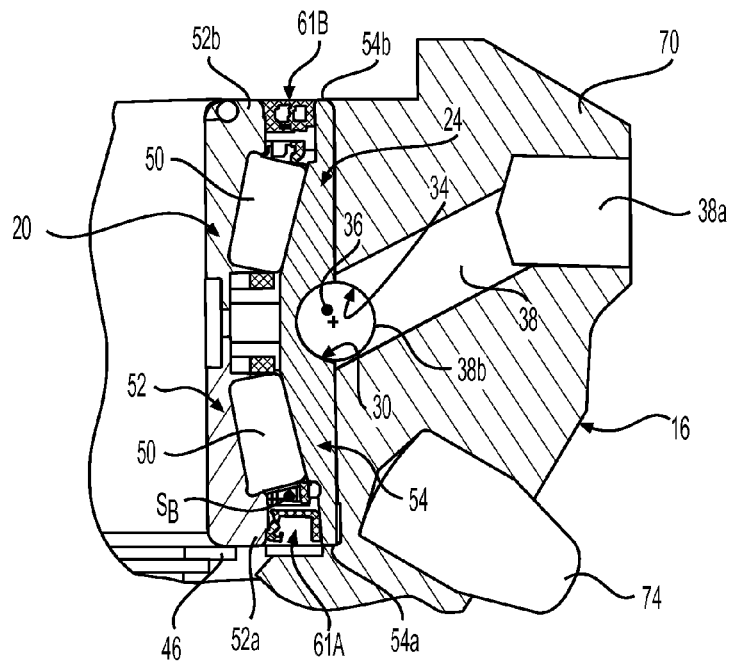
FIG. 6 is a broken-away, axial cross-sectional view of the bearing assembly, showing a retainer passage.
Figure 7:
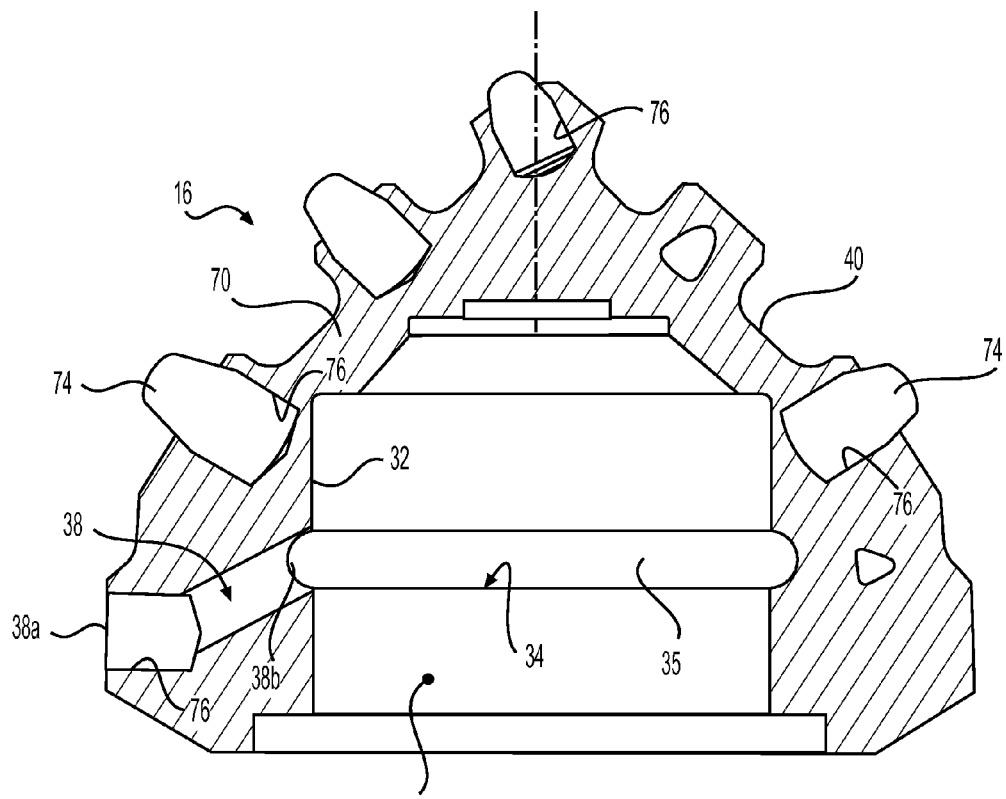
FIG. 7 is an axial cross-sectional view of a bit.

Referring to FIGS. 3 and 4, the bit assembly 10 is preferably used with a rotary drill 12 having a "bit head" or base 14 that includes a plurality of the shafts 15, the drill comprising a plurality of the bearings 20, a plurality of the bits 16, and a plurality of the retainers 26. Specifically, each bearing 20 is disposed about a separate one of the body shafts 15, each bit 16 is disposed about a separate one of the bearings 20, and at least one retainer 26 is disposed within the recess 30 of each of the bearings 20 and is engageable with a proximal bit 16 to rotatably couple the bit 16 with an associated one of the shafts 15. Preferably, the base 14 includes a generally cylindrical central portion 40 and a plurality of support portions 42 extending generally axially from the base portion 40, the support portions 42 being spaced circumferentially apart about a drill centerline 13. With this base structure, each shaft 15 is preferably mounted to a separate support portion 42 so as to extend both generally axially and generally radially inwardly toward the drill centerline 13.

Figure 8:
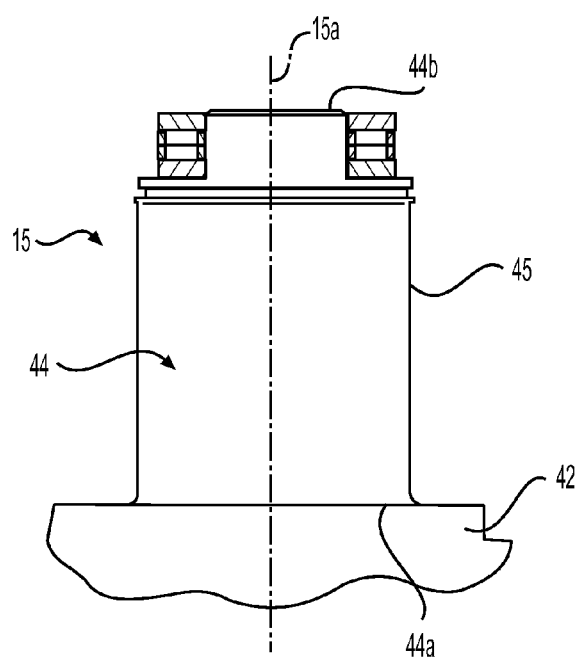
FIG. 8 is broken-away, side elevational view of a bit head shaft.

More specifically, each shaft 15 has a central axis 15a that is angled so as to intersect the drill centerline 13, the plurality of shafts 15 extending or facing generally toward the other shafts 15, as depicted in FIGS. 3 and 4. Referring particularly to FIG. 8, each shaft 15 preferably includes a generally cylindrical body 44 with an inner end 44a mounted on the associated support portion 42, an opposing, free outer end 44b, and an outer circumferential surface 45. The inner member 22 of the associated bearing 20 is disposeable about the outer circumferential surface 45 and is preferably retained thereon by an annular locking member 46 (e.g., a C-clip, threaded nut, etc.). However, the bearing inner member 22 may be secured on the shaft 15 by any other appropriate means, such as for example, a friction or interference fit between the inner member 22 and the shaft 15.

Furthermore, the rotary drill 12 preferably includes at least one drill pipe (not shown) and the base 14 is coupleable with the one or more sections of drill pipe, either directly or through an intermediate collar disposed between the base 14 and the drill pipe. The base 14 preferably has exterior threads 43 formed at an upper end 40a of the base cylindrical portion 40 for threadably connecting with the drill pipe or collar. As is well known in the art of rotary drills, the drill pipe is rotated by an appropriate driver, so as to thereby rotate the connected base 14 about the drill centerline 13. Thus, rotation of the drill pipe rotates each bit 16 about the associated shaft 15 when the bit 16 is engaged with a ground surface. That is, as the base 14 is rotated by the drill pipe, the one or more bits 16 "roll" on the ground surface, and thus each rotate about the central axis 15a of the associated shaft 15.

Referring now to FIGS. 1 and 4-6, the bearing 20 is preferably a "rolling element" bearing that further includes a plurality of rolling elements 50 disposed radially between the bearing inner and outer members 22, 24, respectively. Such rolling elements 50 may be of any appropriate type, for example, balls, cylindrical rollers, tapered rollers, etc., and the bearing 20 may include a single row of rolling elements or a plurality of rows of rolling elements, e.g., a double row bearing as depicted in FIGS. 1 and 4-6. Further, each one of the bearing inner and outer members 22, 24 includes a generally annular body 52, 54, respectively, each having opposing axial ends 52a, 52b and 54a, 54b, respectively. The inner member body 52 has an outer circumferential surface 53 providing at least one first bearing race 56 and the outer member body 54 has an inner circumferential surface 55 providing at least one second bearing race 58. The inner member body 52 further has a central bore 60 sized to receive a portion of the associated shaft 15, to thereby mount the bearing 20 to the shaft 15. Preferably, the bearing 20 further includes a first seal 61A located generally proximal to and between the first ends 52a, 54a of the inner and outer bearing members 22, 24 and a second seal 61B located generally proximal to and between the second ends 52a, 52b of the two bearing members 22, 24. The first and second seals 61A, 61B are each configured to prevent liquid or solid contaminants from entering the generally annular space $S_B$ between the two bearing members 22, 24.

In certain bearing constructions, the bearing outer member 24 has an annular shoulder 62 extending radially outwardly from the remainder of the outer member body 54 and providing a portion 28a of the outer member outer surface 28, as depicted in FIG. 9. With such a shoulder 62, the one or more bearing recesses 30, and preferably the single, continuous bearing groove 31, extends generally radially inwardly from the outer surface portion 28a and into the shoulder 62.

Referring to FIGS. 10 and 11, the bearing 20 may also include a seal 64 configured to seal the space $S_A$ between the bearing 20 and the base 14, specifically between the inner axial end 54b of the bearing outer member 24 and sections of the support portion 42 surrounding the associate shaft 15. Preferably, the bearing outer member 24 has a generally annular groove 66 extending into the outer member 24 from the inner axial end 54b and the seal 64 is disposed within the groove 66 and is configured to seal against the base 14, in particular against a surface 43 surrounding the associated shaft 15. Furthermore, the seal 64 preferably includes a sealing member 68 and a biasing member 69 configured to bias the sealing member generally toward the surface 43 of the base 14, but may have any other appropriate construction or configuration.

Although preferably a rolling element bearing, the bearing 20 may be any other appropriate type of bearing. For example, the bearing 20 may be a "plain" or "journal" bearing in which the bearing outer member inner circumferential surface 55 is slidably disposed generally against the bearing inner member outer surface 53, and may include a lubricant between the adjacent or juxtaposed surfaces 53, 55.

Referring now to FIGS. 1, 3, 4, 6 and 7, the bit 16 preferably includes a generally conical body 70 that provides the inner and outer surfaces 32, 40 and the passage 38 extends through the body 70. The inner surface 32 defines a cavity 72 that is sized to receive the bearing 20, such that the bearing 20 and the associated shaft 15 are at least partially disposed within the cavity 72. Further, a plurality of cutting inserts 74 are preferably mounted on the conical body 70 so as to extend outwardly from the bit outer surface 40, which function to cut and/shear material from a ground surface as the bit 16 rotates upon the associated shaft 15. More specifically, the bit body 70 has a plurality of mounting pockets 76 extending inwardly from the outer surface 40, and each cutting insert 74 is disposed partially within a separate one of the pockets 76. Preferably, the one or more bit access passages 38 each extend into one of the mounting pockets 76, such that the pocket 76 provides the passage outer end 38*a* and the cutting insert 74 disposed within the pocket 76 provides a "cap" for the passage 38, as best shown in FIG. 1. However, each of the one or more access passages 38 may be formed completely separate from the mounting pockets 76, such that each passage outer end 38*a* is located at a point on the bit surface 40 between the pockets 76 (structure not shown). Furthermore, a seal 80 is preferably disposed between the bit body 70 and sections of the base support portion 42 surrounding the associated shaft 15, as indicated in FIGS. 1 and 9.

Although preferably incorporated into a rotary drill 12 as described above and depicted in the drawings, the bearing assembly 10 may be included or incorporated into any other mechanical assembly 12 of at least first and second components, in which at least one of the components is rotatable with respect to the other component. In other words, the scope of the present invention includes any mechanical assembly 12 comprising an inner component, a bearing including an inner member disposed about at least a portion of the inner component and an outer member disposed about the inner member, the bearing outer member having an outer surface and a groove extending radially inwardly from the outer surface, an outer component having an inner surface defining a cavity, an outer surface and a passage extending between the inner and outer surfaces, the cavity being configured to receive at least a portion of the bearing, and at least one retainer insertable through the outer component passage, at least partially disposeable within the bearing groove and configured to engage with the outer component so as to rotatably couple the outer component with the inner component.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing assembly for a rotary drill, the drill including a base with a shaft and a bit with a cavity, the bearing assembly comprising:
 a bearing disposed at least partially within the bit cavity and having a central axis and including an inner member disposeable on the shaft and an outer member disposed about the inner member, the outer member being angularly displaceable about the axis with respect to the inner member and having an outer circumferential surface and a recess extending generally radially inwardly from the outer surface; and
 at least one retainer member disposed at least partially within the bearing outer member recess and configured to engage with the bit so as to releasably lock the bit onto the bearing outer member to rotatably couple the bit with the shaft, wherein the at least one retainer is formed as a generally spherical ball.

2. The bearing assembly as recited in claim 1 wherein the bit has an inner circumferential surface and a recess extending generally radially outwardly from the surface, the bit recess being generally alignable with the bearing recess such that the at least one retainer is simultaneously disposeable at least partially within each of the bit and bearing recesses.

3. The bearing assembly as recited in claim 1 wherein the recess is formed as an at least partially annular groove extending at least partially circumferentially about the bearing central axis and the at least one retainer includes a plurality of retainers spaced apart circumferentially about the central axis, each retainer being disposed at least partially within the bearing groove and configured to engage with the bit.

4. The bearing assembly as recited in claim 3 wherein the bearing groove extends continuously and circumferentially about the bearing central axis and has generally partially circular cross-sections in directions perpendicular to the central axis.

5. The bearing assembly as recited in claim 1 wherein one of:
 the bearing further includes a plurality of rolling elements disposed radially between the bearing inner and outer members; and
 the bearing inner member has an outer circumferential surface and the bearing outer member has an inner circumferential surface slidably disposed against the inner member outer surface.

6. The bearing assembly as recited in claim 1 wherein the each one of the bearing inner and outer members includes a generally annular body.

7. The bearing assembly as recited in claim 1 wherein the bearing outer member has an annular shoulder extending radially outwardly from the remainder of the outer member and providing a portion of the outer member outer surface, the bearing recess extending generally radially inwardly from the outer surface portion into the shoulder.

8. A rotary drill comprising:
 a base with a shaft;
 a bearing having a central axis and including an inner member disposed on the at least one shaft and an outer member disposed about the inner member, the bearing outer member being angularly displaceable relative to the inner member and having an outer circumferential surface and a recess extending generally radially inwardly from the outer surface;
 a bit having an inner circumferential surface defining a cavity, the bit being disposed about at least a portion of the shaft such that the bearing is disposed at least partially within the cavity; and
 at least one retainer disposed at least partially within the bearing outer member recess and configured to engage with the bit so as to releasably lock the bit onto the bearing outer member to rotatably couple the bit with the shaft, wherein the at least one retainer is formed as a generally spherical ball.

9. The rotary drill as recited in claim 8 wherein the bit has an outer surface and a passage extending between the bit outer and inner surfaces, the passage being communicable with the bearing recess such that the retainer is installable into the recess through the bit passage.

10. The rotary drill as recited in claim 9 wherein the bit passage has generally circular cross-sections and the at least one retainer member is configured to roll through the passage and into the bearing recess during installation into the recess.

11. The rotary drill as recited in claim 9 wherein the bit has a recess extending generally radially outwardly from the bit inner surface, the bit recess and the bearing recess being at least generally alignable to form a retention cavity.

12. The rotary drill as recited in claim 11 wherein:
each of the bearing and bit recesses is formed as an at least partially annular groove; and
the at least one retainer includes a plurality of retainers spaced circumferentially about the central axis, each retainer being simultaneously disposeable at least partially within each one of the aligned bit and bearing grooves.

13. The rotary drill as recited in claim 12 wherein the bit passage has an outer end at the bit outer surface and an inner end at the bit recess, the bit passage and each retainer being configured such that the plurality of retainers are installable into the two aligned grooves by sequentially inserting each retainer through the bit passage outer end such that the retainer rolls through the passage, passes through the passage inner end and becomes disposed within the aligned bit and bearing grooves.

14. The rotary drill as recited in claim 9 wherein the bit has a recess extending generally radially outwardly from the bit inner surface, the bit recess and the bearing recess being at least generally alignable such that the at least one retainer is simultaneously disposeable at least partially within each one of the aligned bit and bearing recesses.

15. The rotary drill as recited in claim 14 wherein each one of the bearing recess and the bit recess is formed as a generally annular groove that extends circumferentially about the bearing central axis and the bearing and bit grooves are generally alignable both radially and axially with respect to the central axis.

16. The rotary drill as recited in claim 8 wherein the bearing recess is formed as an at least partially annular groove extending circumferentially about the bearing axis and the at least one retainer includes a plurality of retainers disposed at least partially within the bearing groove and spaced apart circumferentially about the bearing central axis.

17. The rotary drill as recited in claim 8 wherein the bearing recess is continuous, extends circumferentially about the bearing central axis, and has generally partially circular cross-sections in directions perpendicular to the central axis.

18. The rotary drill as recited in claim 8 wherein one of:
the bearing further includes a plurality of rolling elements disposed radially between the inner and outer members; and
the bearing inner member has an outer circumferential surface and the bearing outer member has an inner circumferential surface slidably disposed against the inner member outer surface.

19. The rotary drill as recited in claim 8 wherein the each one of the bearing inner and outer members includes a generally annular body.

20. The rotary drill as recited in claim 8 wherein the bearing outer member has an annular shoulder extending radially outwardly from the remainder of the outer member and providing a portion of the outer member outer surface, the groove extending generally radially inwardly from the outer surface portion into the shoulder.

21. The rotary drill as recited in claim 8 wherein:
the base has a central axis and includes a plurality of the shafts spaced circumferentially about the central axis; and
the drill comprises a plurality of the bearings, each bearing being disposed about a separate one of the body shafts, a plurality of bits, each bit being disposed about a separate one of the shafts, and a plurality of the retainers, at least one of the plurality of retainers being disposed within the groove of each of the bearings and engageable with a proximal one of the plurality of bits to rotatably couple the proximal bit with an associated one of the shafts.

22. The rotary drill as recited in claim 21 wherein the base includes a generally cylindrical central portion and a plurality of support portions extending generally axially from the base portion and spaced circumferentially apart, each shaft being mounted to a separate support portion so as to extend both generally axially and generally radially inwardly.

23. The rotary drill as recited in claim 8 wherein the bit includes a generally conical body, the conical body providing the bit inner circumferential surface, an outer surface and a passage extending through the body, and a plurality of cutting inserts mounted on the conical body so as to extend outwardly from the bit outer surface.

24. The rotary drill as recited in claim 8 further comprising at least one drill pipe having a central axis and being configured to rotate about the central axis, the base being coupleable with the drill pipe such that rotation of the drill pipe rotates the bit about the shaft when the bit engages a ground surface.

25. The rotary drill as recited in claim 8 wherein:
the bearing outer member has an axial end disposed adjacent to the base and a generally annular groove extending into the outer member from the axial end; and
the rotary drill further comprises a generally annular seal disposed within the groove of the bearing outer member and configured to seal against the base.

26. The rotary drill as recited in claim 8 wherein at least one of the bearing assembly and the bit is configured to rotationally interlock with the other one of the bearing assembly and the bit so as to substantially prevent relative angular displacement between the bearing outer member and the bit.

* * * * *